United States Patent
Arizmendi et al.

(10) Patent No.: US 8,099,284 B2
(45) Date of Patent: *Jan. 17, 2012

(54) SYSTEM AND METHOD FOR SPEECH RECOGNITION SYSTEM

(75) Inventors: Iker Arizmendi, West New York, NJ (US); Sarangarajan Parthasarathy, Watchung, NJ (US); Richard Cameron Rose, Watchung, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,564

(22) Filed: May 3, 2010

(65) Prior Publication Data
US 2010/0211396 A1    Aug. 19, 2010

Related U.S. Application Data

(63) Continuation of application No. 10/406,368, filed on Apr. 3, 2003, now Pat. No. 7,711,568.

(51) Int. Cl.
*G10L 21/00* (2006.01)
*G10L 15/00* (2006.01)

(52) U.S. Cl. .............................. 704/270.1; 704/E15.001
(58) Field of Classification Search .................. 704/201, 704/231, 251, 270, 270.1
See application file for complete search history.

(56) References Cited

U.S. PATENT DOCUMENTS

| | | | |
|---|---|---|---|
| 5,960,399 A | 9/1999 | Barclay et al. |
| 6,453,290 B1 | 9/2002 | Jochumson |
| 6,633,846 B1 | 10/2003 | Bennett et al. |
| 6,834,265 B2 | 12/2004 | Balasuriya |
| 2003/0014254 A1 | 1/2003 | Zhang et al. |
| 2004/0073670 A1 | 4/2004 | Chack |
| 2006/0101147 A1 | 5/2006 | Balasuriya |

*Primary Examiner* — Angela A Armstrong

(57) ABSTRACT

A digital speech enabled middleware module is disclosed that facilitates interaction between a large number of client devices and network-based automatic speech recognition (ASR) resources. The module buffers feature vectors associated with speech received from the client devices when the number of client devices is greater than the available ASR resources. When an ASR decoder becomes available, the module transmits the feature vectors to the ASR decoder and a recognition result is returned.

20 Claims, 6 Drawing Sheets

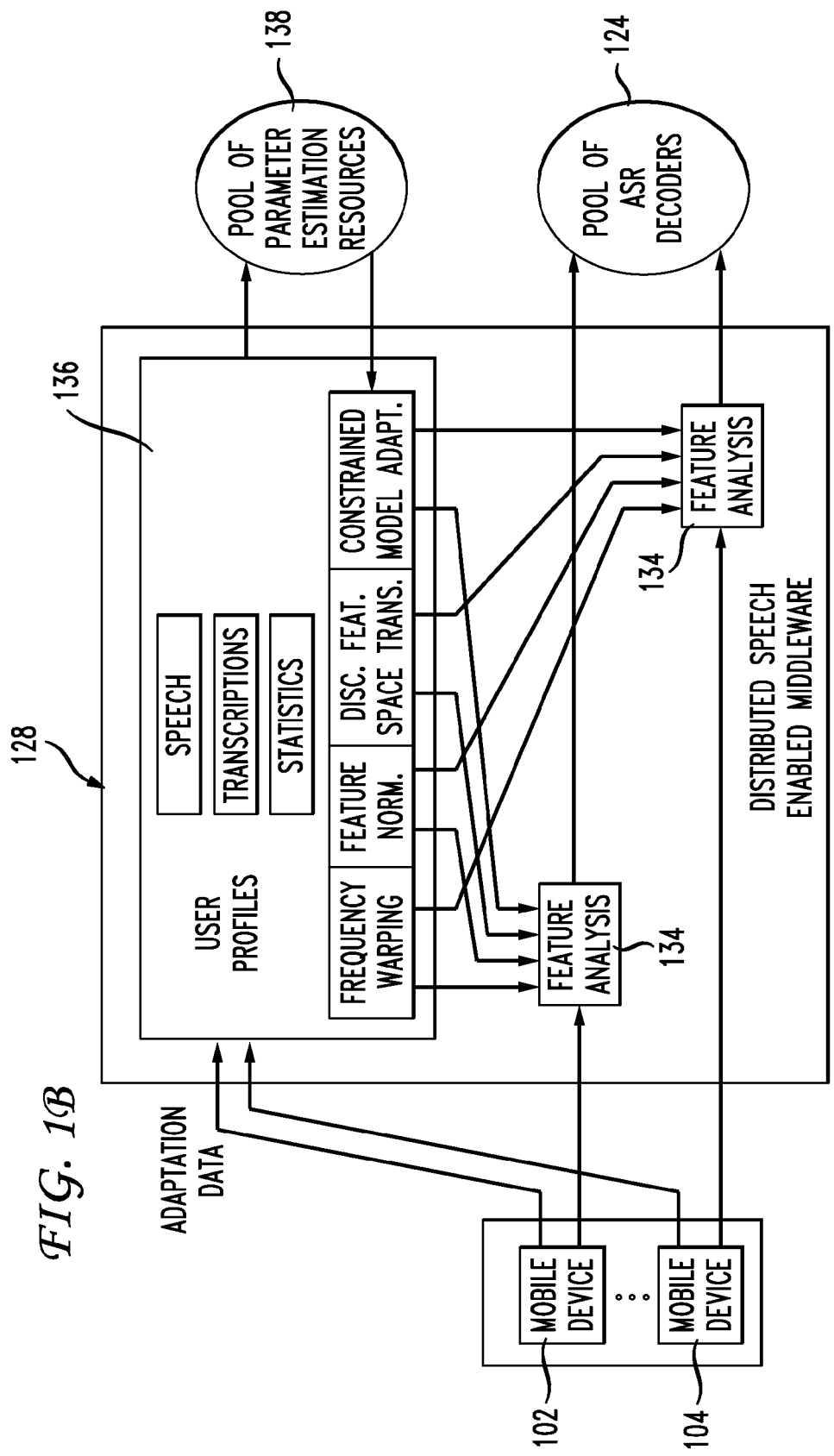

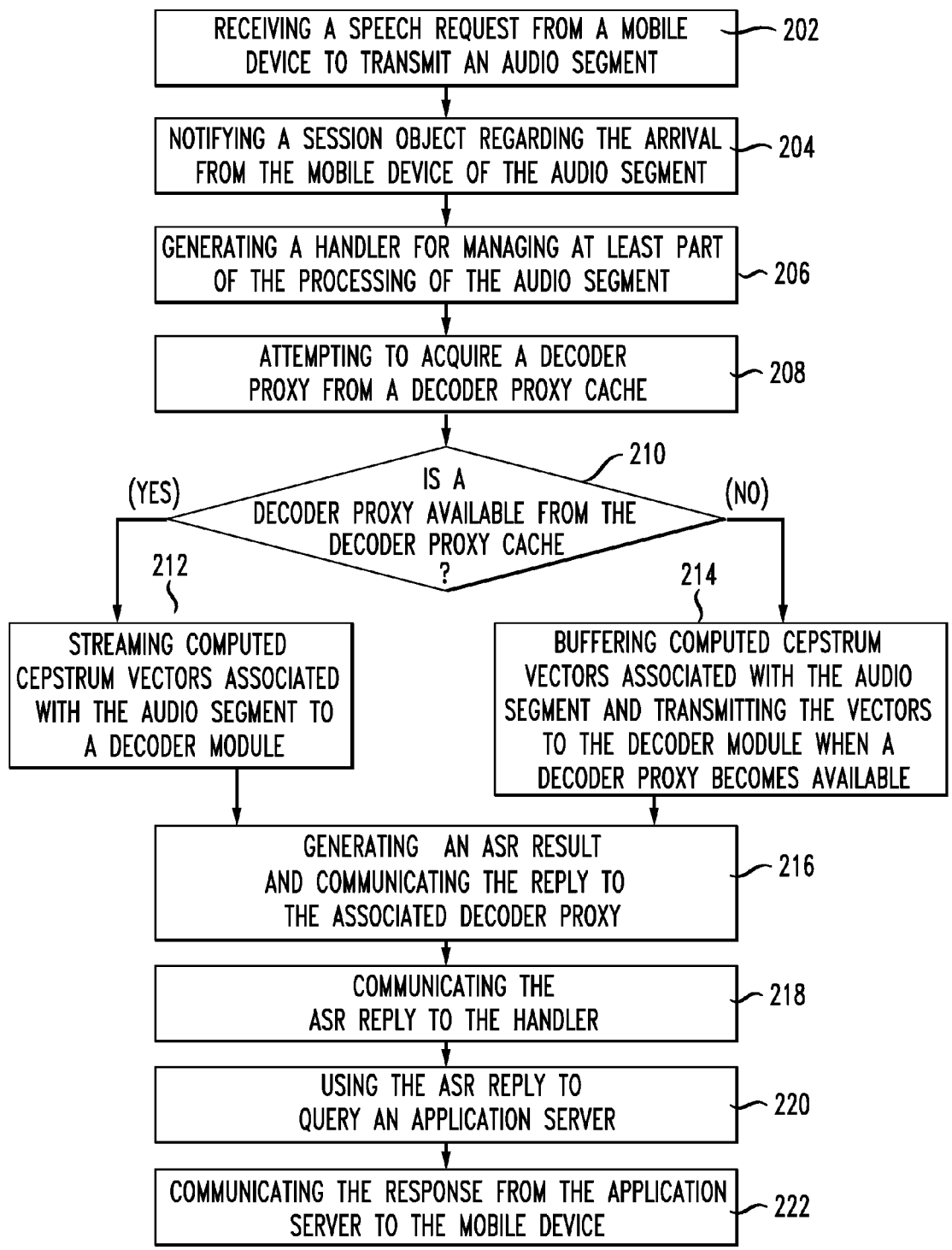

SYSTEM AND METHOD FOR SPEECH RECOGNITION SYSTEM

PRIORITY INFORMATION

The present application is continuation of U.S. patent application Ser. No. 10/406,368, filed Apr. 3, 2003, the contents of which is incorporated herein by reference in its entirety. The present application is related to U.S. patent application Ser. No. 11/779,358, filed Jul. 18, 2007, the contents of which is incorporated herein by reference in its entirety.

FIELD OF THE INVENTION

The present invention relates to automatic speech recognition services and more specifically relates to a framework for implementing ASR services for mobile devices.

BRIEF DESCRIPTION OF THE DRAWINGS

The invention will be described and explained with specificity and detail through the use of the accompanying drawings in which:

FIG. 1B further illustrates the distributed speech enabled middleware for acoustic modeling;

FIG. 2 is a flowchart illustrating an aspect of the present invention;

DETAILED DESCRIPTION OF THE INVENTION

Figure 1A:
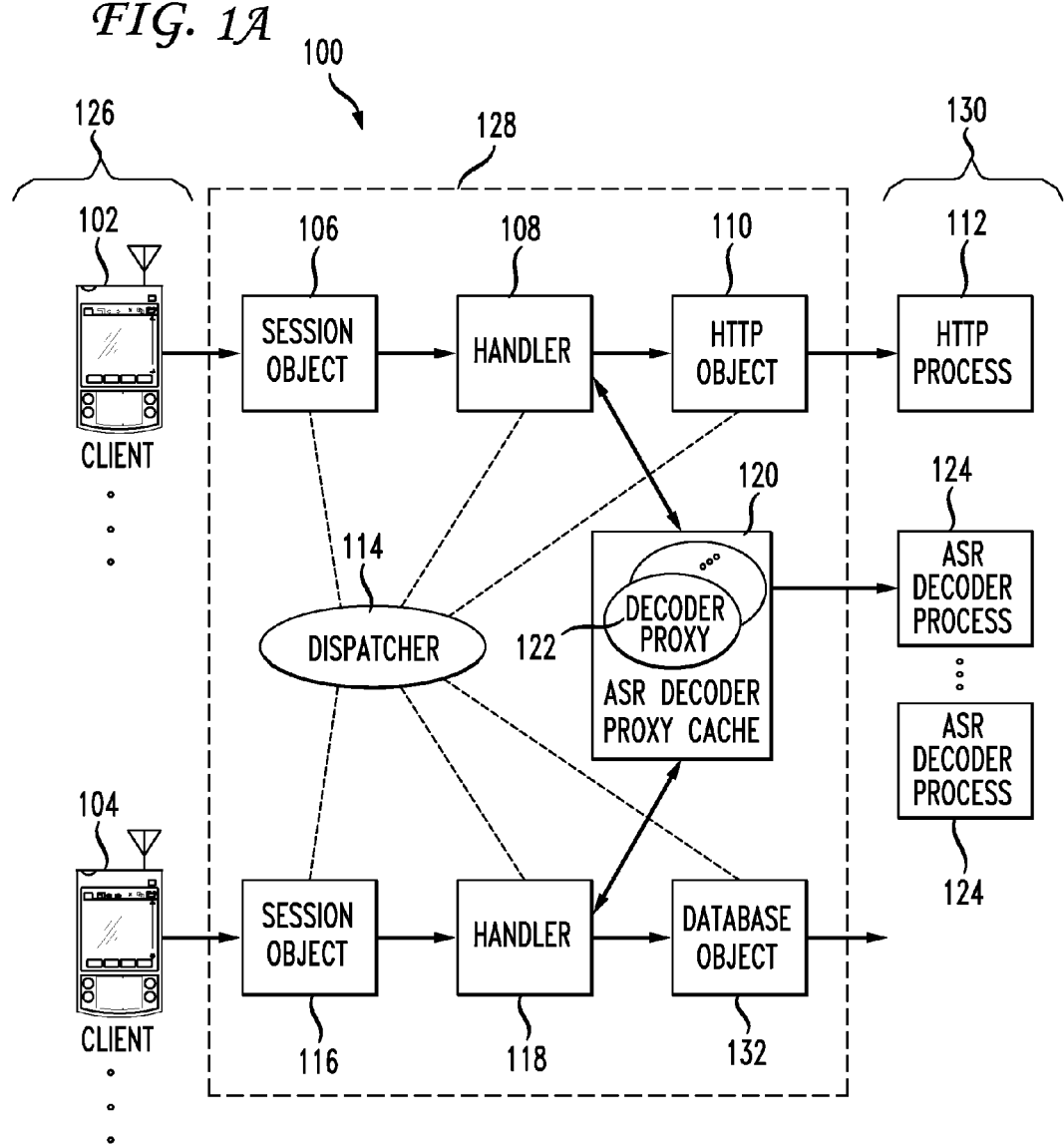
FIG. 1A illustrates a server framework according to an aspect of the present invention.

The process of speech recognition is typically divided into a process of first extracting features from the speech waveform and second decoding the most likely word string from the derived features. The process of feature extraction has a latency that is at least as long as the speech utterance itself, which the decoding process may have a latency that is a small fraction of the utterance duration. To enable a more efficient use of automatic speech recognition (ASR) resources, the present invention generally provides a middleware framework for performing the first portion of automatic speech recognition separate from the decoding process. The invention provides for a more efficient use of ASR resources.

The present invention provides an efficient framework for providing mobile ASR services that is scalable to a large number of users. The framework scales easily to support a large number of mobile users connected over a wireless network and degrades gracefully under peak loads. Using robust acoustic modeling techniques is advantageous because specialized acoustic transducers do not practically operate on mobile devices. Unsupervised acoustic normalization and adaptation techniques as discussed herein can reduce speech recognition word error rate (WER) by 30 percent. An unsupervised paradigm for updating and applying these robust modeling algorithms can be efficiently implemented within the framework. It is important to note, however, that although the invention is described in the context of mobile devices, the invention is certainly not limited to receiving speech data from a mobile device. The invention can provide a communications infrastructure between any computing device, mobile or not, and network-based resources.

Disclosed herein is a description and evaluation of an ASR framework for mobile ASR services. The framework is evaluated in terms of its ability to support a large number of clients simultaneously using a limited set of ASR decoders. One of many potential contexts in which the disclosed framework can operate comprises a directory retrieval ASR application for users of Compaq iPAQ mobile devices over an IEEE 802.11 wireless local area network. The preferred embodiment is written in the C++ language and runs on a Linux operating system. The disclosure will be presented in terms of this context. However, it will be appreciated that the principles of the present invention are not limited to any specific wireless protocol, any specific mobile device or other application.

Also included herein are results from a study demonstrating the effect of unsupervised speaker and environment compensation algorithms in improving ASR performance when user utterances are spoken through the standard iPAQ device mounted microphone. There are a large number of applications for mobile devices that include ASR as a component of the user interface. Several examples of these types of application comprise multimodal dialog applications, voice form filling applications, and value added applications that provide shortcuts to user interface functions. Speech recognition is generally just one part of a multi-modal dialog architecture for these mobile applications whose functional components can be distributed in different ways between computing resources residing in the network and on the mobile device.

While there is a range of potential distributed ASR architectures that have been proposed for these applications, one can make qualitative arguments for when either fully embedded ASR implementations or network-based implementations are most appropriate. It is generally thought that fully embedded implementations are most appropriate for value added applications like name dialing or digit dialing, largely because no network connectivity is necessary when ASR is implemented locally on the device. Distributed or network-based ASR implementations are appropriate for ASR-based services that require access to large application-specific databases where issues of database security and integrity make it impractical to distribute representations of the database to all devices. Network-based implementations also facilitate porting the application to multiple languages and multiple applications without having to affect changes to the individual devices in the network. It is for this reason that the present invention is more appropriately applicable to a network-based architecture. However, it is nevertheless appreciated that the core principles of the invention as set forth in the claims may be applied in any context and are not limited to a network-based architecture.

Acoustic variability in mobile domains is a differentiating factor that distinguishes ASR in mobile domains from generic ASR domains, such as a home office, where background sound can be controlled and minimized. One issue facing users of mobile devices will be using them in a wider variety of continuously varying acoustic environments, making the expected conditions far different than one would expect in wire-line telephone or desktop applications. The use of personalized devices and personalized services facilitates a new paradigm for implementing robust algorithms.

Speaker, channel, and environment representations acquired through normal use of the device can be applied to feature space and model space transformation in ASR. The feature domain speaker normalization/transformation algorithms described below are applied and evaluated under this paradigm.

Multi-user applications are challenged by the need to scale to a potentially large number of users while minimizing the degradation in service response even under peak load conditions. Scaling multimodal applications that include ASR as an input modality presents a challenge, as there is typically a great disparity between the number of potentially active users and a system's limited ability to provide computationally intensive ASR services. The distributed speech enabling middleware (DSEM) framework according to an aspect of the present invention can efficiently implement multimodal applications that maximize performance under both normal loads and peak loads. The DSEM server includes various software modules that provide the channels between client devices and the ASR servers. The DSEM server enables the various mobile devices, ASR servers, other servers such as web-interface servers or HTTP servers, all of which may communicate using different protocols, to exchange and communicate together. Since the invention focuses on the DSEM component, the other modules and client devices are interchangeable. In this regard, the DSEM provides a communications infrastructure that facilitates interaction between a large number of client devices and network-based resources.

Traditional non-ASR server implementations assign a thread or process per client. This approach suffers from degraded performance as the number of clients approaches and exceeds a server's peak capacity. This degradation, typically the result of context switching and synchronization overhead, is accelerated by the high I/O activity necessary to support ASR services. To combat this performance loss, the disclosed DSEM framework uses an event-driven, non-blocking IO model that requires only a single thread to manage a large number of concurrently connected clients. In addition, an ASR decoder cache is employed to effectively share limited decoder resources among active clients.

The basic functional components of the framework can be introduced by way of the example in FIG. 1A which illustrates a framework 100 showing a typical interaction between a DSEM server 128 and one of many clients 102, 104 operating on a wireless network 126. The client devices are connected to the network through one of many possible communications fabrics including, for example, an IEEE 802.11b wireless network or cellular telephone network. The DSEM server 128 moderates and manages the communication between the mobile devices 102, 104 and resources such as an ASR decoder process 124 associated with a decoder module and other resources such as an application server 130 that generates HTTP process 112. The interaction between the clients 102, 104 and the DSEM server 128 usually begins by a user with a mobile device 102 making a voice query. The voice query may be in any application context where the user may interact with the mobile device 102 via a voice command or communication. When this occurs, the mobile device 102 needs to perform an ASR operation to process the voice input and generate a response. In one aspect of the invention, an application running on the DSEM server 128 receives the voice inquiry or data associated with the voice inquiry. Custom protocols may be employed to manage the interactions. A DSEM server dispatcher 114 detects and routes all the system's I/O events and notifies a session object 106 associated with the client 102 of the arrival of an audio stream.

The architecture shown in FIG. 1A provides the capability of processing audio segments associated with the audio stream one at a time. In this manner, resources are conserved and used on a dynamic basis amongst a plurality of mobile devices. The session object 106 serves two purposes. First, the session object 102 is responsible for analyzing the request stream to determine the type of application-specific handler 108 necessary to process it. Second, the session object 102 operates as a repository for any client state that spans the duration of a client's session (e.g., transient acoustic information is stored here). The session object 106 can then instantiate the handler 108 and pass it to the stream for further processing.

Upon activation, the handler 108 performs any required initialization and attempts to acquire a decoder proxy 122 from the decoder proxy cache 120. Decoder proxies 122 act as local representations of decoder processes residing on remote dedicated computer servers. As each portion (audio segment) of the audio stream arrives from the client 102, the handler 108 processes it, performs cepstrum feature analysis and implements acoustic feature space normalizations and transformations. The algorithms applied by the handler 108 for processing the audio stream will be discussed more fully below. If the handler 108 was successful in its attempt to acquire a decoder proxy 122, then the computed cepstrum vectors are streamed directly to a decoding process 124.

The network-based resources include a cache of automatic speech recognition (ASR) decoders (shown as feature 504 in FIG. 5) that given a representation of an input utterance, can return a word string, set of candidate word strings, or a word or phone lattice from which a word string can be derived. The representations of the input utterances could take the form of digitized speech samples or they could take the form of feature vectors that have been extracted through a feature analysis procedure. Other network-based resources may include HTTP servers 112, SQL database servers (not shown), and any other server that might be related to information resources necessary for application running on the client device. The particular distribution of resources between the DSEM and the ASR resources within the network is immaterial to the present invention. For example, the DSEM and ASR resources may or may not be operating on the same server within the network, although FIG. 1 represents them on different devices.

If the handler 108 was unsuccessful in its attempt to acquire a decoder proxy 122, the computed cepstrum vectors are buffered and transmitted as soon as a decoder proxy 122 becomes available. After processing the current audio segment, the handler 108 returns control to the DSEM dispatcher 114 that can then service other clients 104.

The DSEM dispatcher 114, in one embodiment, is a group of modules that serves requests from the various other components in the framework. The dispatcher 114 asynchronously receives notifications from the various other modules and processes the request to open a channel so that the other modules can communicate either each other. The intermittent lines provide an example of how the dispatcher 114 intermittently processes requests and communications amongst the other components.

In this manner, the server dispatcher 114 manages the I/O such that audio segments transmitted from a plurality of client devices 102, 104 are processed independently with individual session objects 106 and handlers 108. Further, according to an aspect of the present invention, rather than assigning a single thread or process per client, an event-driven, non-blocking IO model can utilize a single thread to manage a large number of concurrently connected clients. Other components such as another session object 116, handler 118 and database object 132 are illustrated for scalability purposes and to illustrate other applications of ASR-related database inquiries that differ from web-server inquiries.

When the ASR decoder process obtains a recognition result, it issues a reply to its associated proxy. The dispatcher 114 detects this event and notifies the decoder proxy 122 so that it may read the ASR decoder's 124 reply. The proxy 122 then calls the handler 108 with the recognized phrase or an optional failure code. After receiving the decoded string, the handler 108 uses it to perform a query 110 to a HTTP server 112 or web server 130. The result of the query to the web server 130 is returned to the mobile client 102.

One example application that can be implemented according to the invention uses this technique to retrieve employee information from a company intranet site. The handler 108 instantiates a DSEM HTTP object 110, issues an HTTP request and waits for a reply from the HTTP server 112. When the HTML response arrives, the handler 108 can process it and send an appropriate message to the waiting mobile client 102.

One assumption for the above framework is that it is impractical to permanently assign an ASR decoder to a specific client. In fact, in order to support a large user population, identically configured decoder instances are stored in the cache 120 shown in FIG. 1, assigned only to an individual recognition request from a client 102, and then returned to the cache 120. As a result, it is difficult to adapt the acoustic models in the decoder itself to the user, environment, or channel associated with a particular client. One solution to this problem is to implement all acoustic-modeling techniques for user configuration as feature space normalizations/transformations in the DSEM server. An experimental study was performed to demonstrate the throughput of the framework described above. The goal of the study was to measure both the throughput maintained by the DSEM server 128 and the latencies that would be observed by users of the associated mobile ASR services as the number of users making simultaneous requests increases into the hundreds of users.

The study involved simulating many clients performing the following interaction. Each client 102 generated a speech request to the DSEM server 128 where acoustic feature analysis was performed, features were eventually streamed to an available ASR decoder 124 and the decoded result was returned to the waiting client 102. The infrastructure used for the study included eight 1 GHz Linux ASR servers with each server running four instances of the AT&T Watson ASR decoder and a single 1 GHz Linux DSEM server with 256 Mb of RAM. It is understood that other computer operating systems and ASR decoders of course may be used to implement the principles of the present invention.

FIG. 1B provides further details regarding the functionality of the DSEM server 128. The mobile devices 102 and 104 illustrate the variety of computing devices that may be communicated with according to the principles of the present invention. The feature analysis 134 and adaptation and normalization procedures 136 that are implemented as part of the feature analysis are shown in the DSEM 128. The feature analysis is preferably performed by handlers (see 108 and 118 in FIG. 1A) in the DSEM and access to the ASR decoders 124 is arbitrated suing the ASR decoder proxy cache 120, shown in FIG. 1A. The arrows in FIG. 1B illustrate communication from the adaptation data and user provides having speech, transcriptions and statistics 136 to the feature analysis 134 modules show how the feature analysis blocks 134 obtain user specific parameters from pre-stored use profiles to implement various transformation in feature analysis. These include frequency warping, cepstrum mean normalization, discriminative feature space normalization, and constrained model adaptations. Other processes are also possibly performed. The top portion of FIG. 1B illustrates how speech utterances from the mobile devices 102, 104 are stored in log files associated with user profiles. These are referred to as adaptation utterances and restored along with recognition transcriptions and various other statistics that are used to update all of the user specific transformations depicted in FIG. 1B. Adaptation utterances are utterances received during live use of a spoken dialog system. They are collected, stored and recorded and used to re-estimate various parameters to that as the user later accesses the spoken dialog service, the updated parameters are loaded and used as improved dialog modules. The parameters are re-estimated by configuration servers that are represented by the pool of parameter estimation resources 138. The role of the configuration server is to perform continuous unsupervised estimation of model/feature space transformations.

The following example illustrated in FIG. 2 is a specific implementation of the invention. The component within a distributed network that performs the steps of the invention preferably comprises middleware software that processes speech-related data. In more general terms, the invention comprises receiving a speech request from a computing device, performing a feature analysis of the speech request to generate processed speech data while buffering speech requests from other computing devices, transmitting the processed speech data to an ASR module. Following the speech recognition by the ASR module, the middleware component receives the recognized speech and transmits it to the appropriate device.

FIG. 2 illustrates an example method of practicing the present invention. The method comprises receiving a speech request from a mobile device to transmit an audio segment (202). In the network context, the speech request is likely to be transmitted to a server over a wireless network. In a self-contained mobile device that contains the entire voice-enabled application, the mobile device would receive the speech request and perform all the processing described in the FIGS. 2 and 3.

The dispatcher preferably notifies a session object regarding the arrival from the mobile device of an audio segment (204). The object session generates a handler for managing at least part of the steps for processing the audio segment (206). The handler first attempts to acquire a decoder proxy from a decoder proxy cache (208). As mentioned above, the decoder proxy acts as local representations of decoder processes residing on remote dedicated computer servers. In this manner, the transmitted audio segments from the plurality of client devices are processed independently of each other even if a series of audio segments is sent from the same mobile device.

If a decoder proxy is available (210), then the method comprises streaming computed cepstrum vectors associated with the audio segment to a decoder module (212). The decoder module may comprise known decoders such as AT&T's Watson ASR. If a decoder proxy is not available to respond to the handler's request (210), then the method comprises buffering the computed cepstrum vectors associated with the audio segment and transmitting the vectors to the decoder module when a decoder proxy becomes available (214). Preferably, the handler computes the cepstrum vectors and applies the other acoustic compensation algorithms to the data associated with the audio segments. However, it will be understood that any arrangement of components either within the network or on the mobile devices may perform the acoustic compensation operations to improve ASR.

The decoder module generates an ASR result and communicates the result to the associated decoder proxy (216). The decoder proxy communicates the ASR reply to the handler (218). Preferably, the distribution server dispatcher controls the various interactions between the components used in connection with the present invention. For example, when the decoder module decodes the audio segment and generates the ASR reply, the dispatcher receives notification of a ready ASR reply and notifies the decoder proxy so that it may receive the ASR decoder's reply.

The handler receives the ASR reply and uses the reply to generate a DSEM HTTP object and issues an HTTP request to query a database or an application server (220). When an HTML or other response arrives from the database or application server, the handler processes it and sends an associated message to the waiting mobile device.

Figure 3:
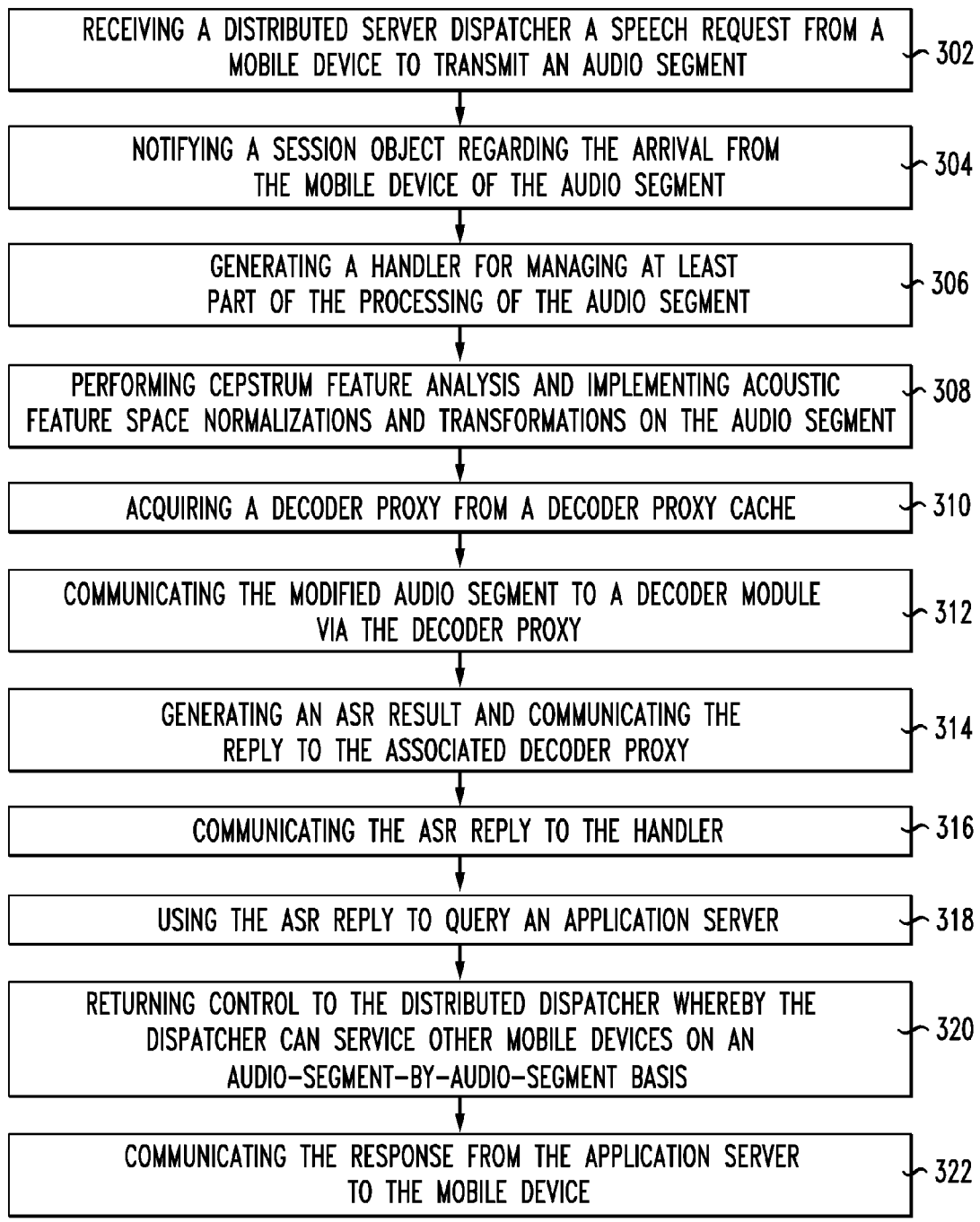
FIG. 3 is a flowchart illustrating another aspect of the present invention.

FIG. 3 illustrates another aspect of the present invention. According to this aspect, a method of processing speech data comprises receiving at a server dispatcher a speech request from a mobile device to transmit an audio segment (302). The dispatcher notifies a session object regarding the arrival from the mobile device of the audio segment (304). The session object generates a handler for managing at least part of the processing of the audio segment (306). The handler performs cepstrum feature analysis and implements acoustic feature space normalizations and transformations on the audio segment (308). The handler acquires a decoder proxy from a decoder proxy cache (310). The modified audio segment is communicated to a decoder module via the decoder proxy (312). The decoder module generates an ASR result and communicates the reply to the associated decoder proxy (314). The decoder proxy communicates the ASR reply to the handler (316) and the handler uses the ASR reply to query an application server (318). The handler returns control to the dispatcher whereby the dispatcher can service other mobile devices on an audio segment-by-audio segment basis (320). Finally, a response from the application server is communicated to the mobile device (322).

Figure 4A:
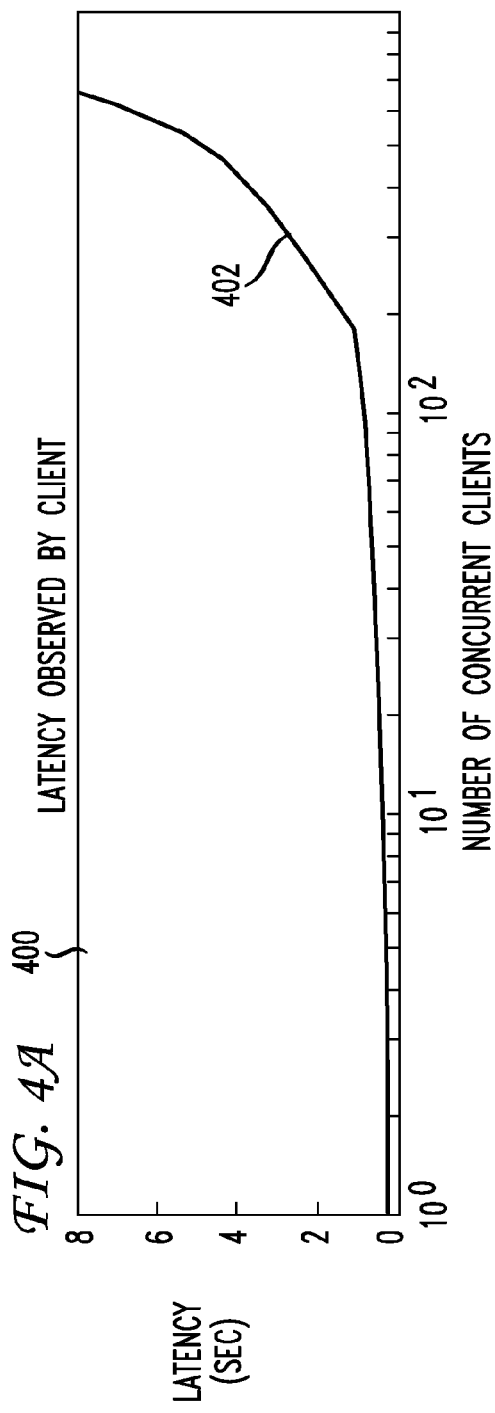
FIGS. 4A and 4B illustrate server performance for average response latency and average server throughput respectively.

FIG. 4A illustrates the effect on response latency as the number of concurrent clients increases. The response latency 402 was calculated as the interval in seconds between the time that the speech request was generated by the client and the time that the recognition result was returned to the client by the DSEM server. The plot 400 in FIG. 4A shows a relatively constant latency when the number of clients is less than 128 and a gracefully degrading response latency as the number of clients is increased. This increase in latency is due to the delay imposed on clients by the DSEM decoder wait queue that throttles access to available decoders and to increased pressure on the DSEM server itself. Studies show that the DSEM does not pose a bottleneck even when the number of ASR clients is much larger than the available ASR decoder resources.

Figure 4B:
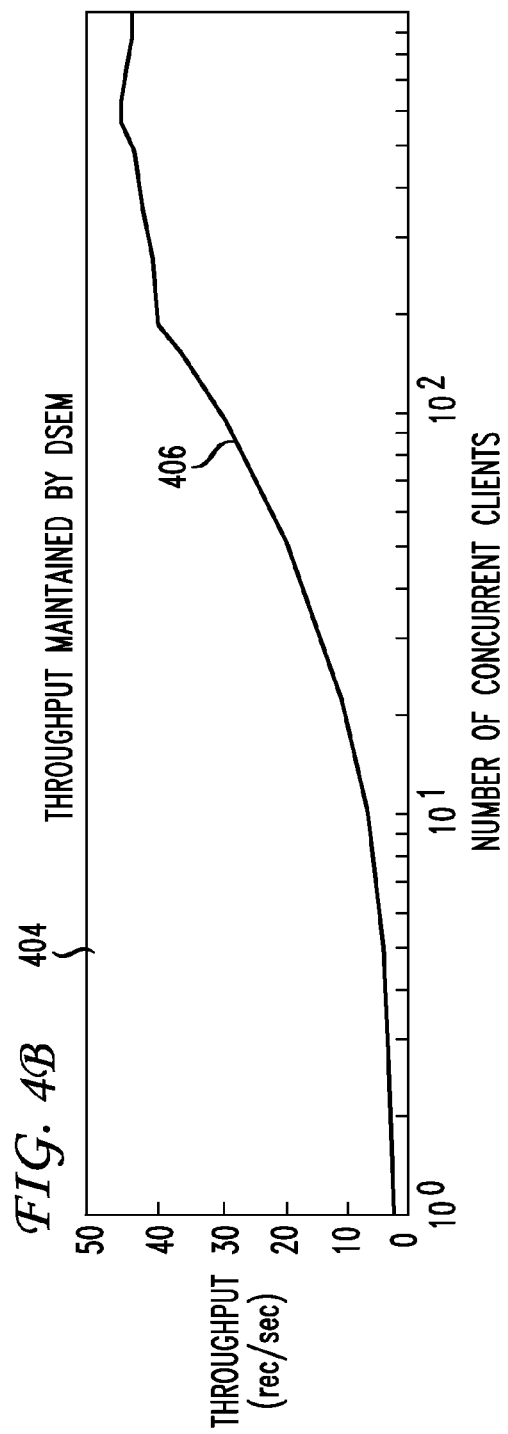

FIG. 4B illustrates the effect on server throughput 406 as the number of concurrent clients increases. Throughput was calculated as the number of completed recognition transactions per second. The plot 404 in FIG. 4B demonstrates that throughput gradually increases until the server's peak capacity is reached at a point corresponding to 128 clients and remains constant even as the number of clients far exceeds this peak capacity.

The application of normalization and transformation algorithms in the context of the mobile ASR framework is described next. As mentioned above, the handler 108 shown in FIG. 1A preferably applies these algorithms. However, other components such as the dispatcher 114 may also refer to various kinds of devices and in a non-network based context, a mobile device may apply these algorithms. These algorithms are applied to compensating utterances spoken by users of Compaq iPAQ hand-held devices. Discussed above is the notion of acquiring representations of the speaker, environment, and transducer associated with a given client from utterances spoken during the normal use of the device. The algorithms that are applied here under this paradigm include frequency warping-based speaker normalization, constrained model adaptation (CMA) and speaker adaptive training (SAT), and cepstrum and variance normalization. Those of skill in the art are aware of the implementation of these algorithms.

There are two major constraints that are placed on acoustic compensation algorithms both by the framework of the present invention and by the contemplated applications. The first constraint is that all robust acoustic algorithms are applied in the feature space rather than by adapting or transforming the acoustic hidden Markov model (HMM). This constraint is dictated by the dynamic assignment of decoders to individual utterances by the DSEM server 128, making it difficult to configure the model parameters of these decoders to a particular user. The second constraint is that acoustic compensation parameters are estimated off-line from dedicated adaptation utterances rather than from the recognition utterances themselves. In addition to the fact that personalized services can be well suited to this paradigm, there are two motivations for this constraint. The first is that input utterances can be very short, sometimes single word, utterances that are spoken to fill in "voice fields" appearing on the display of the hand-held device. These short utterances can be insufficient for robust parameter estimation. Second, the computational complexity associated with estimating frequency warping and CMA parameters could overwhelm the DSEM if performed at recognition time.

Robust acoustic compensation algorithms can be used as part of the present invention. The algorithms are applied to compensating utterances spoken into a far-field device-mounted microphone with respect to acoustic HMM models that were trained in a mis-matched acoustic environment. Normalization/transformation parameters are estimated using anywhere from approximately one second to one minute of speech obtained from previous utterances spoken by the user of the device.

The first technique is frequency warping-based speaker normalization. This was performed by selecting a single linear warping function using the adaptation utterances for a given speaker to maximize the likelihood of the adaptation speech with respect to the HMM. Then, during speech recognition for that speaker, the warping factor is retrieved and applied to scaling the frequency axis in mel-frequency cepstrum coefficient (MFCC) based feature analysis. A "warped HMM" is trained by estimating optimum warping factors for all speakers in the training set and retraining the HMM model using the warped utterances.

There are several regression-based adaptation algorithms that obtain maximum likelihood estimates of model transformation parameters. The techniques differ primarily in the form of the transformations. Constrained model space adaptation (CMA) is investigated here. CMA estimates a model transformation $\{A, b\}$ to an HMM, $\lambda$, with means and variances $\mu$ and $\Sigma$, $$\mu' = A\mu - b;\ \Sigma' = A\Sigma A^T$$

in order to maximize the likelihood of the adaptation data, $X$, $P(X|\lambda, A, b)$. The term "constrained" refers to the fact that the same transformation is applied to both the model means and covariances. Since the variances are transformed under CMA, it is generally considered to have some effect in compensating the HMM with respect to environmental variability as well as speaker variability.

An important implementational aspect of CMA is that this model transformation is equivalent to transforming the feature space $x'_t = Ax_t + b$. It is applied during recognition to the 39-component feature vector composed of cepstrum observations and the appended first and second order difference cepstrum. A speaker adaptive training (SAT) HMM is trained by estimating an optimum CMA transform for each speaker in the training set and retraining the HMM model using the transformed utterances.

Cepstrum mean normalization (CMN) and cepstrum variance normalization (CVN) were also applied under a similar scenario as the algorithms described above. Normalization vectors were computed from adaptation utterances for each speaker and then used to initialize estimates of normalization vectors for each input utterance. The incorporation of additional speech data provided by this simple modification to standard cepstrum normalization procedures had a significant impact on ASR performance.

The feature normalization/adaptation algorithms described above were used to reduce acoustic mismatch between task-independent HMM models and utterances spoken through a Compaq iPAQ hand-held device over the framework described herein. Described herein is a scenario under which the algorithms were evaluated, the speech database, and the experimental study.

The dataset for the study included a maximum of 400 utterances of proper names per speaker from a population of six speakers. The utterances were spoken through the device-mounted microphone on the hand-held device in an office environment. Since the data collection scenario also involved interacting with the display on the hand-held device, a distance of from approximately 0.5 to 1.0 meters was maintained between the speaker and the microphone. The first 200 utterances for each speaker were used for estimating the parameters of the normalizations and transformations described above. After automatic endpointing, this corresponded to an average of 3.5 minutes of speech per speaker. The remaining 1200 utterances, corresponding to isolated utterances of last names, were used as a test set for the experimental study described below.

A baseline acoustic hidden Markov model (HMM) was trained from 18.4 hours of speech that correspond to 35,900 utterances of proper names and general phrases spoken over wire-line and cellular telephone channels. After decision tree-based state clustering, the models consisted of approximately 3450 states and 23,500 Gaussian densities.

The baseline WER on the above test set was found to be 41.5 percent. This can be compared to a WER of 26.1 percent obtained on the same task for a different population of speakers speaking into a close-talking noise canceling microphone. The goal of the robust compensation algorithms applied here is to close the gap between these two scenarios. It was also shown in previous work that by combining lattices obtained from utterances spoken separately in response to first name and last name fields and rescoring them with a language model that describes the constraints between those fields, a WER of 10.1 percent could be obtained.

Table 1 displays the results for the experimental study as the word error rate (WER) resulting from the use of each of the individual algorithms where parameters are estimated using adaptation data of varying length. Columns 2 through 5 of Table 1 correspond to the WER obtained when 1.3, 6.8, 13.4, and 58.2 seconds of speech data are used for speaker dependent parameter estimation:

TABLE 1

| | Compensation Algorithm | | | |
|---|---|---|---|---|
| | Average 1.3 | Adaptation 6.8 | Data 13.4 | Duration (sec) 58.2 |
| Baseline | 41.5 | 41.5 | 41.5 | 41.5 |
| N | 40.2 | 37.2 | 36.8 | 36.8 |
| N + W | 36.7 | 33.8 | 33.6 | 33.3 |
| N + W + C | — | 35.0 | 32.3 | 29.8 |
| N + W + C + SAT | — | 34.4 | 31.5 | 28.9 |

There are several observations that can be made from Table 1. First, by comparing rows 1 and 2, it is clear that simply initializing mean and variance normalization estimates using the adaptation data (N) results in a significant decrease in WER across all adaptation data sets. Second, frequency warping (W) is also shown to provide significant reduction in WER with the most dramatic reduction occurring for the case where an average of only 1.3 seconds of adaptation data per speaker is used to estimate warping factors. Third, by observing rows 4 and 5 of Table 1, it is clear that constrained model adaptation (C) actually increases WER when the transformation matrix is estimated from less than 13.4 seconds of adaptation data. However, significant WER, rate reductions were obtained as the adaptation data length was increased. It is important to note that the over-training problem observed here for adaptation algorithms resulting from insufficient adaptation data is well known. Future work will investigate the use of procedures that prevent over-training by interpolating counts estimated on a small adaptation set with those obtained from other sources of data.

Two developments associated with the implementation of robust mobile ASR services on hand-held devices have been presented. The first is an efficient framework for mobile ASR based services. The DSEM server was shown in FIG. 2 to maintain acceptable response latencies with simultaneous ASR accesses from many hundreds of simulated mobile clients. The second is an efficient means for implementing robust acoustic compensation algorithms when there is little opportunity to influence the audio specifications of the device and little opportunity to sample all possible environments in HMM training. A set of acoustic compensation procedures was applied in an unsupervised user configuration scenario. These procedures, which include frequency warping-based speaker normalization, constrained model adaptation, and off-line CMN and CVN, were shown in Table 1 to reduce word error rate by 30 percent.

Figure 5:
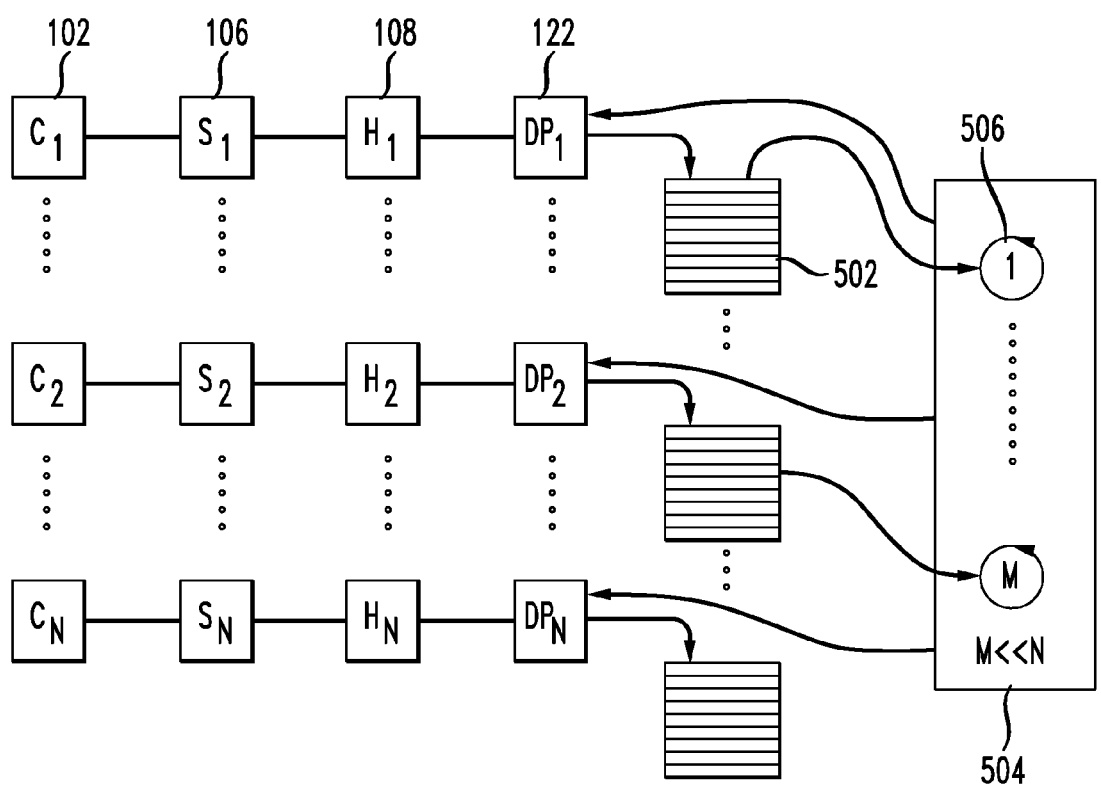
FIG. 5 illustrates another embodiment of the invention.

FIG. 5 illustrates another embodiment of the present invention. In this figure, similar components share the same reference numbers as are shown in FIG. 1A. For example, sets of client devices $C_1, C_2 \ldots C_N$ 102, session objects $S_1, S_2 \ldots S_N$ 106, handlers $H_1, H_2 \ldots H_N$ 108, and decoder proxies $DP_1, DP_2, DP_N$ 122 are shown. Further, buffers 502 for feature vectors or cepstrum data are shown. An ASR decoder cache 504 relates to a group of decoder instances operating in a network-based context to provide ASR services to the plurality of client devices communicating with the network.

In the illustration of the embodiment of the invention shown in FIG. 5, it is assumed that the system configuration consists of a relatively large number of N clients 102 and that for reasons of cost and efficient use of network based computing resources, it is desirable to minimize the number M of decoder instances 506. In striving to obtain efficient use of resources, it is also necessary to minimize the total latency observed by the client device 102 from the time the speech utterance ends to the time a result is returned to the client device 102.

Further, given some representation of an input utterance of length L seconds, it is assumed that the time D necessary for the ASR decoders 506 to perform the decoding task and return a result is often much less than L. So the actual time, from the end of an utterance to the ASR decoder 506 producing a result, is bound not by the processing time of the decoder but instead by the real-time associated with transmitting and buffering the speech samples as they are obtained from the client device 102. The implication of this disparity between decoder processing time and system I/O time is that the ASR decoders 506 would be assigned to an individual client 102 for a far longer amount of time than is necessary for them to process the speech and obtain a result.

Performing the feature analysis procedure and buffering features in the DSEM 128 (not shown in FIG. 5; but the cepstrum buffers 502 are associated with the DSEM 128) allows the communications infrastructure to make more efficient use of the ASR decoders 506. If the number of N clients 102 is greater than the number of M available decoders 506, acceptable latencies can be maintained by the following process.

Suppose there are M clients 102 sending speech to the DSEM 128 so that all M decoders 506 have been assigned. When an $(M+1)^{st}$ client begins sending speech to the DSEM 128, feature vectors are buffered in the DSEM cepstrum buffers 502. Preferably, the cepstrum buffers 502 buffer the feature vectors for the client devices 102 not being serviced by ASR decoders 506. Then, when an ASR decoder 506 becomes available, these feature vectors can immediately be transmitted to the decoder 506 and a result can be returned in (D<<L) seconds. (FIG. 5 illustrates the results being transmitted from the decoders 506 back to the decoder proxy 122 process associated with each client device 102). As an example, if the decoder 506 can process speech at a rate of eight times faster than real time, and the utterance is four seconds in length, then only a 0.5 second delay is introduced.

Also note that this efficient arrangement keeps D constant even as the number of clients increases significantly. If the difference, N−M, between the number of clients 102 and the number of available decoders 506 increases, then the maximum response time R any client 102 will experience is just (N−M)D.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communication connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, other implementations such as point-to-point communications may be employed using the principles of the present invention. The invention is not limited to any particular distribution of modules that perform the steps of the invention. Therefore, it is contemplated that the principles of the present invention that are not directly limited to network contexts may also be applied to other contexts. Accordingly, the appended claims and their legal equivalents should only define the invention, rather than any specific examples given.

We claim:

1. A method of processing speech data, the method comprising, at a speech server:
   receiving an audio segment;
   acquiring a decoder proxy for the audio segment from a decoder proxy cache;
   passing to the decoder proxy a recognized phrase generated by performing speech recognition on the audio segment; and
   issuing a query based on the recognized phrase.

2. The method of claim 1, wherein the speech server receives the speech request using a custom protocol.

3. The method of claim 1, wherein a speech server dispatcher notifies a session object of the audio segment.

4. The method of claim 1, wherein a session object further analyzes the audio segment to determine a type of application-specific handler to generate.

5. The method of claim 4, wherein a session object further stores client states for a duration of a user device session.

6. The method of claim 5, wherein the session object further stores transient acoustic information.

7. The method of claim 1, further comprising, if no recognized phrase associated with the result is identified, communicating a failure code to the user device.

8. A method of processing speech data, the method comprising, at a speech sensor:
   receiving an audio segment;
   processing the audio segment via a decoder proxy acquired from a decoder proxy cache;

if the decoder proxy is successfully acquired, streaming computed cepstrum vectors to a decoding process; and if the decoder proxy is not successfully acquired, buffering the computed cepstrum vectors and transmitting the computed cepstrum vectors when the decoder proxy is acquired.

9. The method of claim 8, further comprising, after processing the audio segment via the decoder proxy, returning control to a server dispatcher for servicing other user devices.

10. The method of claim 9, wherein the server dispatcher manages speech requests from multiple user devices on a speech segment by speech segment basis.

11. The method of claim 9, further comprising:
notifying the server dispatcher of a recognition result from the decoder process;
transmitting a decoder result to the decoder proxy;
transmitting a recognized phrase from the decoded result from the decoder proxy to a handler; and
using the recognized phrase to query an application server.

12. The method of claim 8, further comprising:
applying at least one acoustic compensation algorithm to the audio segment.

13. The method of claim 12, wherein the at least one acoustic compensation algorithm comprises frequency warping-based speaker normalization.

14. The method of claim 12, wherein the at least one acoustic compensation algorithm comprises constrained model adaptation.

15. The method of claim 12, wherein the at least one acoustic compensation algorithm comprises speaker adaptive training.

16. The method of claim 12, wherein the at least one acoustic compensation algorithm comprises cepstrum and variance normalization.

17. A system for managing speech segments received from a plurality of user devices, the system comprising:
a processor;
a server dispatcher module for controlling the processor to detect and route system I/O events;
a decoder proxy cache containing a plurality of decoder proxies, each decoder proxy representing a decoder process;
a handler module controlling the processor to acquire a decoder proxy for a speech segment from the decoder proxy cache; and
a decoder processing module for controlling the processor to receive the speech segment from the decoder proxy and return the automatic speech recognition result to the decoder proxy, wherein the handler module further controls the processor to query an application sensor based on the automatic speech recognition result.

18. The system for managing speech segments of claim 17, wherein the handler module further controls the processor to perform cepstrum feature analysis on the speech segment.

19. The system for managing speech segments of claim 18, wherein the handler module further controls the processor to perform acoustic feature space normalizations and transformations on the speech segment.

20. The system for managing speech segments of claim 19, wherein parameters used for the acoustic feature space normalizations and transformations on the speech segment are estimated using speech obtained from previous utterances spoken by the user of the user device.

* * * * *